(12) United States Patent
Divakaran et al.

(10) Patent No.: US 7,003,038 B2
(45) Date of Patent: Feb. 21, 2006

(54) ACTIVITY DESCRIPTOR FOR VIDEO SEQUENCES

(75) Inventors: Ajay Divakaran, Scotch Plains, NJ (US); Huifang Sun, Cranbury, NJ (US); Hae-Kwang Kim, Seoul (KR); Chul-Soo Park, Suwon-Si (KR); Xinding Sun, Goleta, CA (US); Bangalore S. Manjunath, Santa Barbara, CA (US); Vinod V. Vasudevan, Singapore (SG); Manoranjan D. Jesudoss, Singapore (SG); Ganesh Rattinassababady, Singapore (SG); Hyundoo Shin, Santa Barbara, CA (US)

(73) Assignee: Mitsubishi Electric Research Labs., Inc., Cambridge, MA (US)

( * ) Notice: Subject to any disclaimer, the term of this patent is extended or adjusted under 35 U.S.C. 154(b) by 483 days.

(21) Appl. No.: 10/217,918

(22) Filed: Aug. 13, 2002

(65) Prior Publication Data

US 2003/0026340 A1   Feb. 6, 2003

Related U.S. Application Data

(63) Continuation of application No. 09/406,444, filed on Sep. 27, 1999, now abandoned.

(51) Int. Cl.
*H04B 1/66* (2006.01)
(52) U.S. Cl. .............................................. 375/240.16
(58) Field of Classification Search ........... 375/240.15, 375/240.16, 240.17, 240.18; 709/247; 708/203; 34/607; H04B 1/66
See application file for complete search history.

(56) References Cited

U.S. PATENT DOCUMENTS

| | | | | |
|---|---|---|---|---|
| 5,574,663 A | * | 11/1996 | Ozcelik et al. | 709/247 |
| 5,983,251 A | * | 11/1999 | Martens et al. | 708/203 |
| 6,061,100 A | * | 5/2000 | Ward et al. | 348/607 |
| 6,597,738 B1 | * | 7/2003 | Park et al. | 375/240.16 |

* cited by examiner

*Primary Examiner*—Tung Vo
(74) *Attorney, Agent, or Firm*—Dirk Brinkman; Andrew J. Curtin

(57) ABSTRACT

A method describes activity in a video sequence. The method measures intensity, direction, spatial, and temporal attributes in the video sequence, and the measured attributes are combined in a digital descriptor of the activity of the video sequence.

21 Claims, 14 Drawing Sheets

```
Activity Descriptor
{
    stream_id                          8    uimsbf
    start_frame                       20    uimsbf
    total_frames                      12    uimsbf
    intensity_of_motion()
    direction_of_motion_flag          1          uimsbf
    spatial_distribution_flag         1          uimsbf
    temporal_distribution_flag        1    uimsbf
    if(direction_of_motion_flag)
    {
        direction_of_motion()
    }
    if(spatial_distribution_flag)
    {
        spatial_distribution()
    }
    if(temporal_distribution_flag)
    {
        temporal_distribution()
    }
}
```
⌐900

FIG. 9

```
sub_descriptor_1
{
    activity_value        10    uimsbf
    activity_power         3    uimsbf
    activity_power_sign    1    uimsbf
}
```
— 1000

FIG. 10

```
activity_power_sign
if (activity_power_sign)
    activity_value*=activity_power
else
    activity_value/=activity_power sub_descriptor_2
{
    avg_alpha_value              10    uimsbf
    alpha_power                   3    uimsbf
    alpha_power_sign              1    uimsbf
    no_of_levels                  4    uimsbf
    for(i=0;i<no_of_levels;i++)
    {
        percentage_value_of_level_i  10  uimsbf
        percentage_power              3   uimsbf
    }
}
```

FIG. 11

```
sub_descriptor_3
{
    avg_avg_direction_value              10   uimsbf
    avg_avg_direction_power               3   uimsbf
    avg_avg_direction_power_sign 1 uimsbf
    dev_avg_direction_value              10   uimsbf
    dev_avg_direction_power               3   uimsbf
    dev_avg_direction_power_sign 1 uimsbf
    avg_dev_direction_value              10   uimsbf
    avg_dev_direction_power               3   uimsbf
    avg_dev_direction_power_sign 1 uimsbf
    dev_dev_direction_value              10   uimsbf
    dev_dev_direction_power               3   uimsbf
    dev_dev_direction_power_sign 1 uimsbf
}
```

```
sub_descriptor_4
{
    avg_mot_complexity_value        10   uimsbf
    avg_mot_complexity_power         3   uimsbf
    avg_mot_complexity_power_sign    1   uimsbf
    avg_Nsr_value                   10   uimsbf
    avg_Nmr_value                   10   uimsbf
    dev_Nlr_value                   10   uimsbf
}
```

FIG. 13

| Activity Descriptor | | |
|---|---|---|
| { | | |
| stream_id | 8 | uimsbf |
| start_frame | 20 | uimsbf |
| total_frames | 12 | uimsbf |
| activity_value | 10 | uimsbf |
| activity_power | 3 | uimsbf |
| activity_power_sign | 1 | uimsbf |
| direction_of_motion_flag | 1 | uimsbf |
| spatial_distribution_flag | 1 | uimsbf |
| temporal_distribution_flag | 1 | uimsbf |
| if(direction_of_motion_flag) | | |
| { | | |
| avg_avg_direction_value | 10 | uimsbf |
| avg_avg_direction_power | 3 | uimsbf |
| avg_avg_direction_power_sign | 1 | uimsbf |
| dev_avg_direction_value | 10 | uimsbf |
| dev_avg_direction_power | 3 | uimsbf |
| dev_avg_direction_power_sign | 1 | uimsbf |
| avg_dev_direction_value | 10 | uimsbf |
| avg_dev_direction_power | 3 | uimsbf |
| avg_dev_direction_power_sign | 1 | uimsbf |
| dev_dev_direction_value | 10 | uimsbf |
| dev_dev_direction_power | 3 | uimsbf |
| dev_dev_direction_power_sign | 1 | uimsbf |
| } | | |
| if(spatial_distribution_flag) | | |
| { | | |
| avg_Nsr_value | 10 | uimsbf |
| avg_Nmr_value | 10 | uimsbf |
| avg_Nlr_value | 10 | uimsbf |
| } | | |
| if(temporal_distribution_flag) | | |
| { | | |
| no_of_levels | 4 | uimsbf |
| for(i=0;i<no_of_level;i++) | | |
| { | | |
| percentage_value_of_level_i | 10 | uimsbf |
| percentage_power | 3 | uimsbf |
| } | | |
| } | | |
| } | | |

ACTIVITY DESCRIPTOR FOR VIDEO SEQUENCES

This application is a continuation of application Ser. No. 09/406,444 filed on Sep. 27, 1999, now abandoned.

FIELD OF THE INVENTION

The present invention relates generally to extracting features from a video sequence, and more particularly, to extracting features indicative of activity in the video sequence.

BACKGROUND OF THE INVENTION

Compressed Video Formats

Basic standards for compressing the bandwidth of digital color video signals have been adopted by the Motion Picture Experts Group (MPEG). The MPEG standards achieve high data compression rates by developing information for a full frame of the image only every so often. The full image frames, i.e. intra-coded frames, are often referred to as "I-frames" or "anchor frames," and contain full frame information independent of any other frames. Image difference frames, i.e. inter-coded frames, are often referred to as "B-frames" and "P-frames," or as "predictive frames," and are encoded between the I-frames and reflect only image differences i.e. residues, with respect to the reference frame.

Typically, each frame of a video sequence is partitioned into smaller blocks of picture element, i.e. pixel, data. Each block is subjected to a discrete cosine transformation (DCT) function to convert the statistically dependent spatial domain pixels into independent frequency domain DCT coefficients. Respective 8×8 or 16×16 blocks of pixels, referred to as "macro-blocks," are subjected to the DCT function to provide the coded signal.

The DCT coefficients are usually energy concentrated so that only a few of the coefficients in a macro-block contain the main part of the picture information. For example, if a macro-block contains an edge boundary of an object, the energy in that block after transformation, i.e. as represented by the DCT coefficients, includes a relatively large DC coefficient and randomly distributed AC coefficients throughout the matrix of coefficients.

A non-edge macro-block, on the other hand, is usually characterized by a similarly large DC coefficient and a few adjacent AC coefficients which are substantially larger than other coefficients associated with that block. The DCT coefficients are typically subjected to adaptive quantization, and then are run-length and variable-length encoded for the transmission medium. Thus, the macro-blocks of transmitted data typically include fewer than an 8×8 matrix of codewords.

The macro-blocks of inter-coded frame data, i.e. encoded P or B frame data, include DCT coefficients which represent only the differences between a predicted pixels and the actual pixels in the macro-block. Macro-blocks of intra-coded and inter-coded frame data also include information such as the level of quantization employed, a macro-block address or location indicator, and a macro-block type. The latter information is often referred to as "header" or "overhead" information.

Each P frame is predicted from the lastmost occurring I or P frame. Each B frame is predicted from an I or P frame between which it is disposed. The predictive coding process involves generating displacement vectors, often referred to as "motion vectors," which indicate the magnitude of the displacement to the macro-block of an I frame most closely matches the macro-block of the B or P frame currently being coded. The pixel data of the matched block in the I frame is subtracted, on a pixel-by-pixel basis, from the block of the P or B frame being encoded, to develop the residues. The transformed residues and the vectors form part of the encoded data for the P and B frames.

Older video standards, such as ISO MPEG-1 and MPEG-2, are relatively low-level specifications primarily dealing with temporal and spatial compression of video signals. With these standards, one can achieve high compression ratios over a wide range of applications. Newer video coding standards, such as MPEG-4, see "Information Technology—Generic coding of audio/visual objects," ISO/IEC FDIS 14496-2 (MPEG4 Visual), November 1998, allow arbitrary-shaped objects to be encoded and decoded as separate video object planes (VOP). These emerging standards are intended to enable multimedia applications, such as interactive video, where natural and synthetic materials are integrated, and where access is universal. For example, one might want to extract features from a particular type of video object, or to perform for a particular class of video objects.

With the advent of new digital video services, such as video distribution on the INTERNET, there is an increasing need for signal processing techniques for identifying information in video sequences, either at the frame or object level, for example, identification of activity.

Feature Extraction

Previous work in feature extraction for video indexing from compressed data has primarily emphasized DC coefficient extraction. In a paper entitled "Rapid Scene Analysis on Compressed Video," IEEE Transactions on Circuits and Systems for Video Technology, Vol. 5, No. 6, December 1995, page 533–544, Yeo and Liu describe an approach to scene change detection in the MPEG-2 compressed video domain. The authors also review earlier efforts at detecting scene changes based on sequences of entire uncompressed image data, and various compressed video processing techniques of others. Yeo and Liu introduced the use of spatially reduced versions of the original images, so-called DC images, and DC sequences extracted from compressed video to facilitate scene analysis operations. Their "DC image" is made up of pixels which are the average value of the pixels in a block of the original image and the DC sequence is the combination of the reduced number of pixels of the DC image. It should be noted that the DC image extraction based technique is good for I-frames since the extraction of the DC values from I-frames is relatively simple. However, for other type frames, additional computation is needed.

Won et al, in a paper published in Proc. SPIE Conf. on Storage and Retrieval for Image and Video Databases, January 1998, describe a method of extracting features from compressed MPEG-2 video by making use of the bits expended on the DC coefficients to locate edges in the frames. However, their work is limited to I-frames only.

Kobla et al describe a method in the same Proceedings using the DC image extraction of Yeo et al to form video trails that characterize the video clips.

Feng et al. (IEEE International Conference on Image Processing, Vol. II, pp. 821–824, Sep. 16–19, 1996), use the bit allocation across the macro-blocks of MPEG-2 frames to detect abrupt scene changes, without extracting DC images. Feng et al.'s technique is computationally the simplest since it does not require significant computation beyond that required for parsing the compressed bit-stream.

U.S. Patent applications entitled "Methods of scene change detection and fade detection for indexing of video sequences" (application Ser. No. 09/231,698, filed Jan. 14, 1999), "Methods of scene fade detection for indexing of video sequences" (application Ser. No. 09/231,699, filed Jan. 14, 1999), "Methods of Feature Extraction for Video Sequences" (application Ser. No. 09/236,838, Jan. 25, 1999), describe computationally simple techniques which build on certain aspects of Feng et al.'s approach and Yeo et al's approach to give accurate and simple scene change detection. Once a suspected scene or object change has been accurately located in a group of consecutive frames by use of a DC image extraction based technique, application of an appropriate bit allocation-based technique and/or an appropriate DC residual coefficient processing technique to P or B-frame information in the vicinity of the located scene quickly and accurately locates the cut point. This combined method is applicable to either MPEG-2 frame sequences or MPEG-4 multiple object sequences. In the MPEG-4 case, it is advantageous to use a weighted sum of the change in each object of the frame, using the area of each object as the weighting factor.

U.S. patent application Ser. No. 09/345,452 entitled "Compressed Bit-Stream Segment Identification and descriptor" filed by Divakaran et al. on Jul. 1, 1999 describes a technique where magnitudes of displacements of inter-coded frames are determined based on the bits in the compressed bit-stream associated with the inter-coded frames. The inter-coded frame includes macro-blocks. Each macro-block is associated with a respective portion of the inter-coded frame bits which represent the displacement from that macro-block to the closest matching intra-coded frame. The displacement magnitude is an average of the displacement magnitudes of all the macro-blocks associated with the inter-coded frame. The displacement magnitudes of those macro-blocks which are less than the average displacement magnitude are set to zero. The number of run lengths of the zero magnitude macro-blocks is determined and also used to identify the first inter-coded frame.

Activity

Work done so far has focussed on extraction of motion information, and using the motion information for low level applications such as detecting scene changes. There still is a need to extract features for higher level applications. For example, there is a need to extract features that are indicative of the nature of the activity in a video sequence. A video or animation sequence can be perceived as being a slow sequence, a fast paced sequence, an action sequence, and so forth.

Examples of high activity include scenes such as goal scoring in a soccer match, scoring in a basketball game, a high speed car chase. On the other hand, scenes such as news reader shot, an interview scene, or a still shot are perceived as low action shots. A still shot is one where there is little change in the activity frame-to-frame. Video content in general spans the gamut from high to low activity.

Therefore there is a need for a descriptor that accurately expresses the activity of a given video sequence or shot and comprehensively covers the aforementioned gamut of activities. Such a descriptor will enable video indexing and searching applications.

SUMMARY OF THE INVENTION

The invention provides a method for describing activity in a compressed or uncompressed video sequence that can include video and audio components. The method measures intensity, direction, spatial, and temporal attributes in the video sequence. The measured attributes are then combined in a digital descriptor of the activity of the video sequence. If the video sequence is uncompressed, then it is preferred that an optical flow is measured. For compressed video, measuring motion vectors is preferred. The sequence can include multiple frames or objects of a shot.

BRIEF DESCRIPTION OF THE DRAWINGS

FIGS. 9–14 are block diagram of data structures expressing the activity descriptor according to the invention.

DETAILED DESCRIPTION OF THE PREFERRED EMBODIMENT

Activity Descriptor

Figure 1:
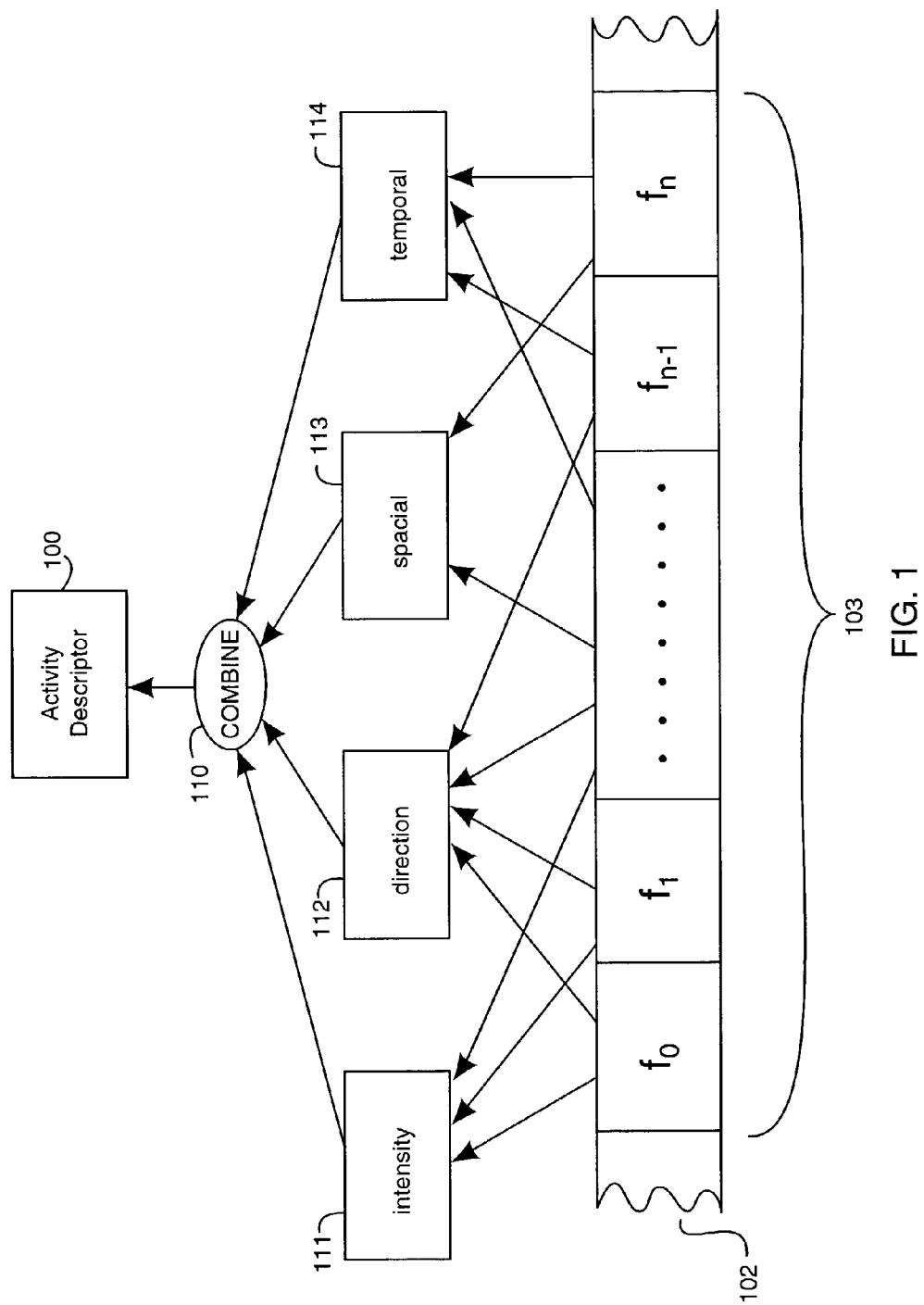
FIG. 1 is a block diagram of an activity descriptor according to the invention.

As shown in FIG. 1, our invention provides an activity descriptor 100 for a video sequence 102. The video sequence includes a plurality of frames ($f_0, \ldots, f_n$) that form a "shot" 103. Herein, a shot or a segment of the video sequence means a set of frames that have some activity cohesiveness. It should also be understood, that our invention can be used for video sequences that encode video objects having either video or audio components, or both.

The video 102 includes spatial information, and if there is more than one frame, then there is temporal information as well. Therefore, our activity descriptor has spatial and temporal dimensions. For instance, the descriptor conveys whether the activity is concentrated in some small spatial regions of a frame, or whether it is spread uniformly throughout the frame. Similarly, our activity descriptor conveys information on the directional characteristics of the activity. For, example, the descriptor can express the duration of activity. In addition, frames may express various intensity levels of activity.

Therefore, the activity descriptor 100 according to our invention combines 110 intensity 111, direction 112, spatial 113, and temporal 114 attributes of the activity in the video sequence.

We derive the activity descriptor from motion information in the video sequence. The video sequence can be uncompressed, in which case we extract the motion information from the optical flow, or the video sequence can be compressed, in which case we use motion vectors. As stated above, the sequence 101 can be frame or object based, or combinations thereof.

We describe methods for extracting the activity attributes, a syntax for expressing the activity descriptor, and various ways that the activity attributes can be combined. We also describe how the activity descriptor can be used in content-based querying, and other higher level user oriented video processing applications.

The following section describe how we extract motion information to obtain the activity attributes according to our invention.

Motion Vector Magnitude

The parameters for activity descriptor can be derived from the magnitude of video motion vectors as follows. For object or frame an "activity matrix" $C_{mv}$ is defined as:

$$C_{mv} = \{R(i, j)\}$$

where $$(R(i, j)) = \sqrt{x_{i,j}^2 + y_{i,j}^2}$$

where $(x_{i,j}, y_{i,j})$ is the motion vector associated with the (i,j)th block. For the purpose of extracting the activity descriptor 100, in an MPEG video, for example, we consider P-frames or P-objects, and construct the descriptor for a frame or object in the following steps.

Figure 2:
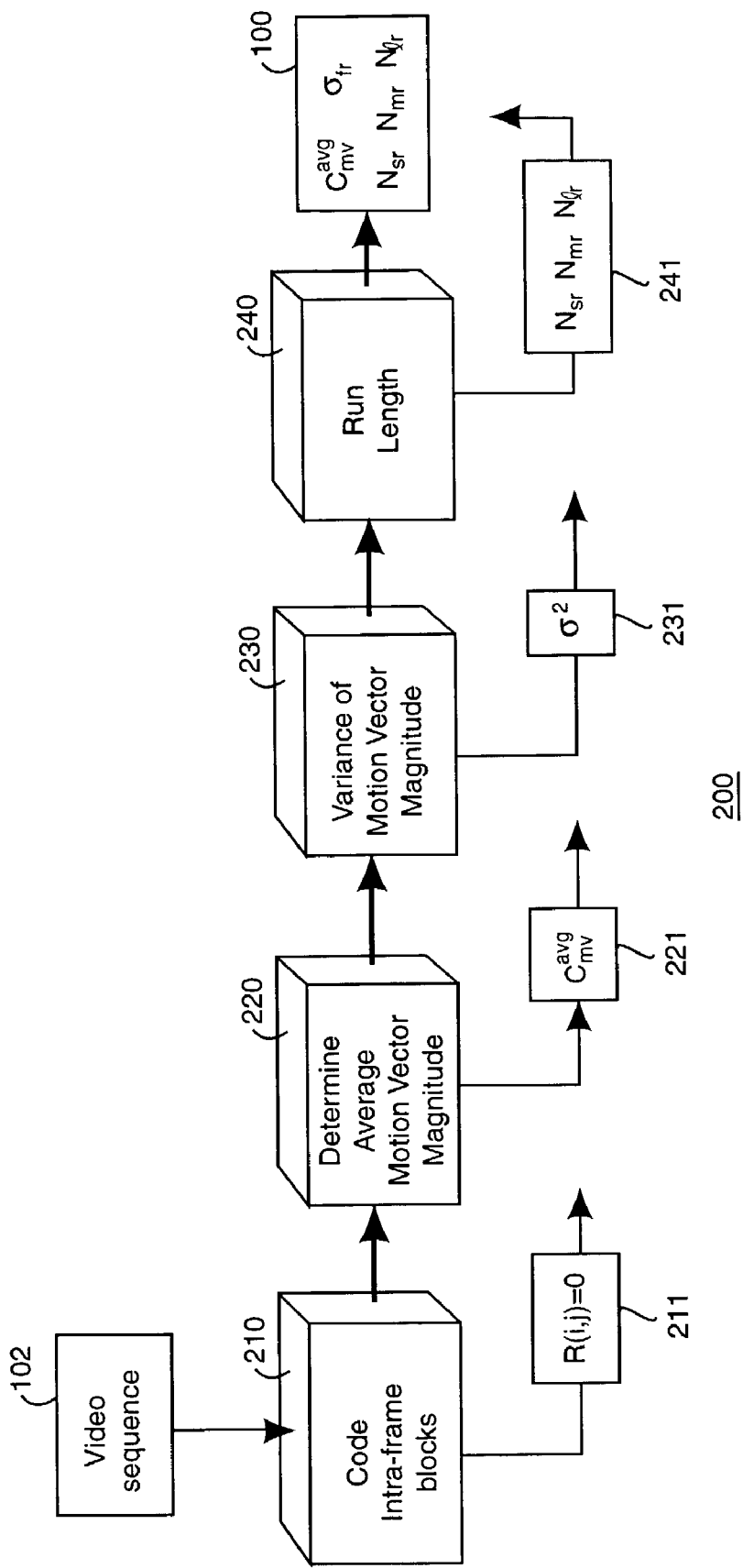
FIG. 2 is a flow diagram of a method for extracting the activity descriptor from the magnitudes of motion vectors of a frame.

FIG. 2 shows a method 200 for extracting activity attributes 100. In step 210, intra-coded blocks, R(i,j) 211 are set to zero. Step 220 determines the average motion vector magnitude $C_{mv}^{avg}$ 221 for each macro-block (MB) of the frame/object as:

$$C_{mv}^{avg} = \frac{1}{MN} \sum_{i=0}^{M} \sum_{j=0}^{N} C_{mv}(i, j)$$

$M$ = width in $MB's$ $N$ = height in $MB's$

Step 230 determines the variance $\sigma^2$ 231 of $C_{mv}^{avg}$ as:

$$\sigma_{fr}^2 = \frac{1}{MN} \sum_{i=0}^{M} \sum_{j=0}^{N} (C_{mv}(i, j) - C_{mv}^{avg})^2$$

$M$ = width in $MB's$ $N$ = height in $MB's$

Step 240 determines the "run-length" features 241 of $C_{mv}$ by using the average as a threshold on the activity matrix as:

$$C_{mv}^{thresh}(i, j) = \begin{cases} C_{mv}(i, j), & \text{if } C_{mv}(i, j) \geq C_{mv}^{avg} \\ 0, & \text{and otherwise} \end{cases}$$

determine lengths of runs of zeroes in the above matrix, using a raster-scan order. The run-lengths are classified into three categories, short, medium and long. The run-lengths are also normalized with respect to the object/frame width. We have defined short runs to be ⅓ of the frame width or less, medium runs are greater than ⅓ the frame width and less than ⅔ of the frame width, and the long runs are greater than or equal to the width.

In the notation below, we use $N_{sr}$ as the number of short runs, and medium and long runs are similarly defined with $N_{mr}$ and $N_{lr}$, respectively. We "quantize" the run-lengths to get some invariance with respect to rotation, translation, reflection, and the like.

Therefore, the activity parameters 100 for the frame/object include:

$$C_{mv}^{avg}, \sigma_{fr}, N_{sr}, N_{mr}, N_{lr}.$$

Note, the run-length features indirectly express the number, size, and shape of distinct moving objects in the frame and their distribution across the frame. For a frame with a single large object, such as a talking head, the number of short run-lengths is high, whereas for a frame with several small objects, such as an aerial shot of a soccer game, the number of short run-lengths is lower.

Motion Vector Direction

Figure 3:
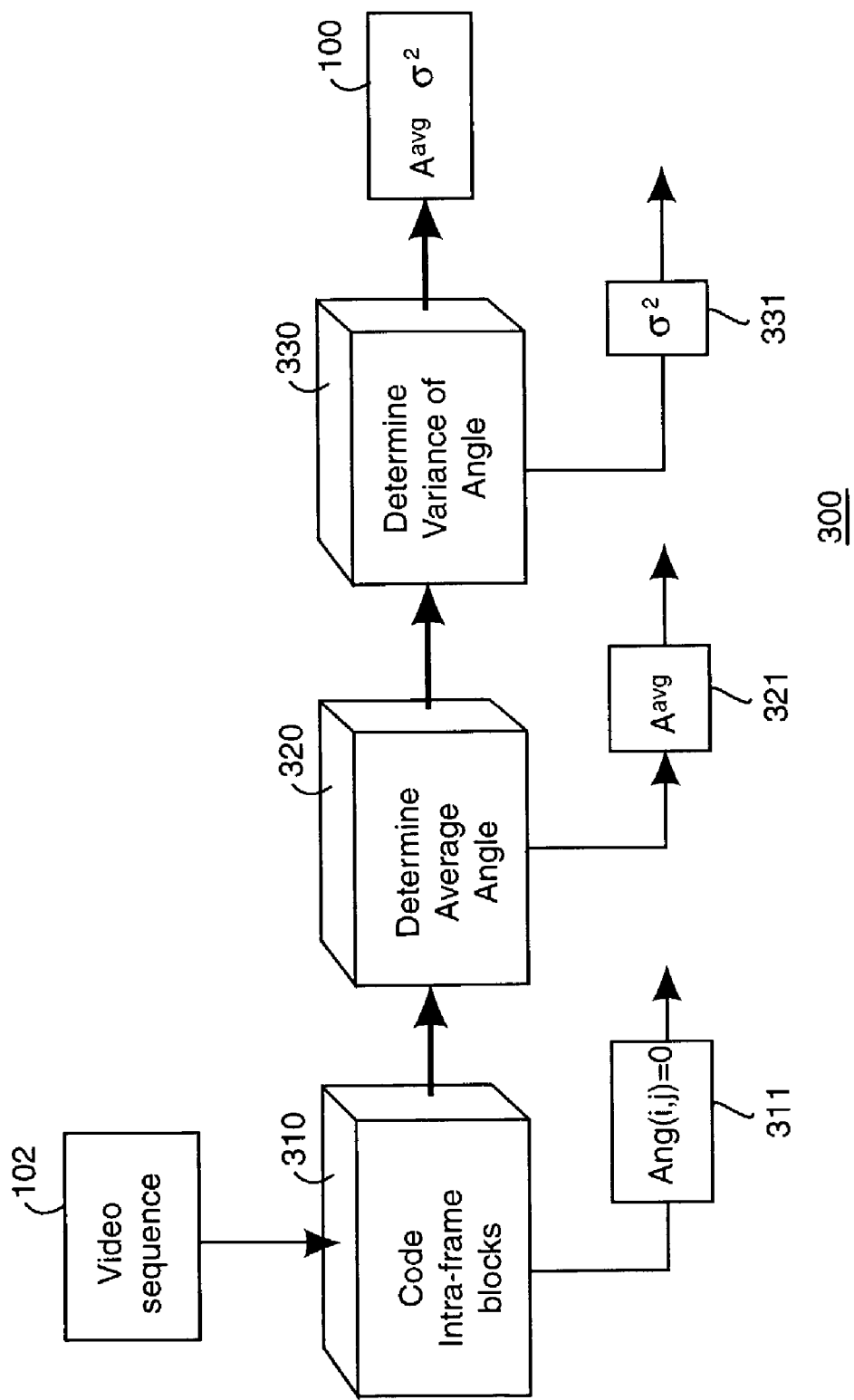
FIG. 3 is a flow diagram of a method for extracting the activity descriptor from the directions of the motion vectors.

Activity parameters can also be obtained from an "angle matrix" A for each object or frame as shown in FIG. 3.

$$A = \{Ang(i, j)\}$$

where $$(Ang(i, j)) = \tan^{-1}(y_{i,j}/x_{i,j})$$

where $(x_{i,j}, y_{i,j})$ is the motion vector associated with the (i,j)th block. As above for a MPEG sequence, for the magnitude, we consider only P-frames/objects, and construct the descriptor for a frame in the following steps.

For intra-coded blocks, the angle matrix Ang(i,j) 311 is set to zero in step 310. Step 320 determines the average angle $C_{mv}^{avg}$ 321 per macro-block of each frame/object as:

$$A^{avg} = \frac{1}{MN} \sum_{i=0}^{M} \sum_{j=0}^{N} A(i, j)$$

$M$ = width in $MB's$ $N$ = height in $MB's$

Step 330 determines the variance $\sigma^2$ 331 of the angle matrix A as:

$$\sigma_{fr_r}^{ang2} = \frac{1}{MN} \sum_{i=0}^{M} \sum_{j=0}^{N} (A(i, j) - A^{avg})^2$$

$M$ = width in $MB's$ $N$ = height in $MB's$

Figure 4:
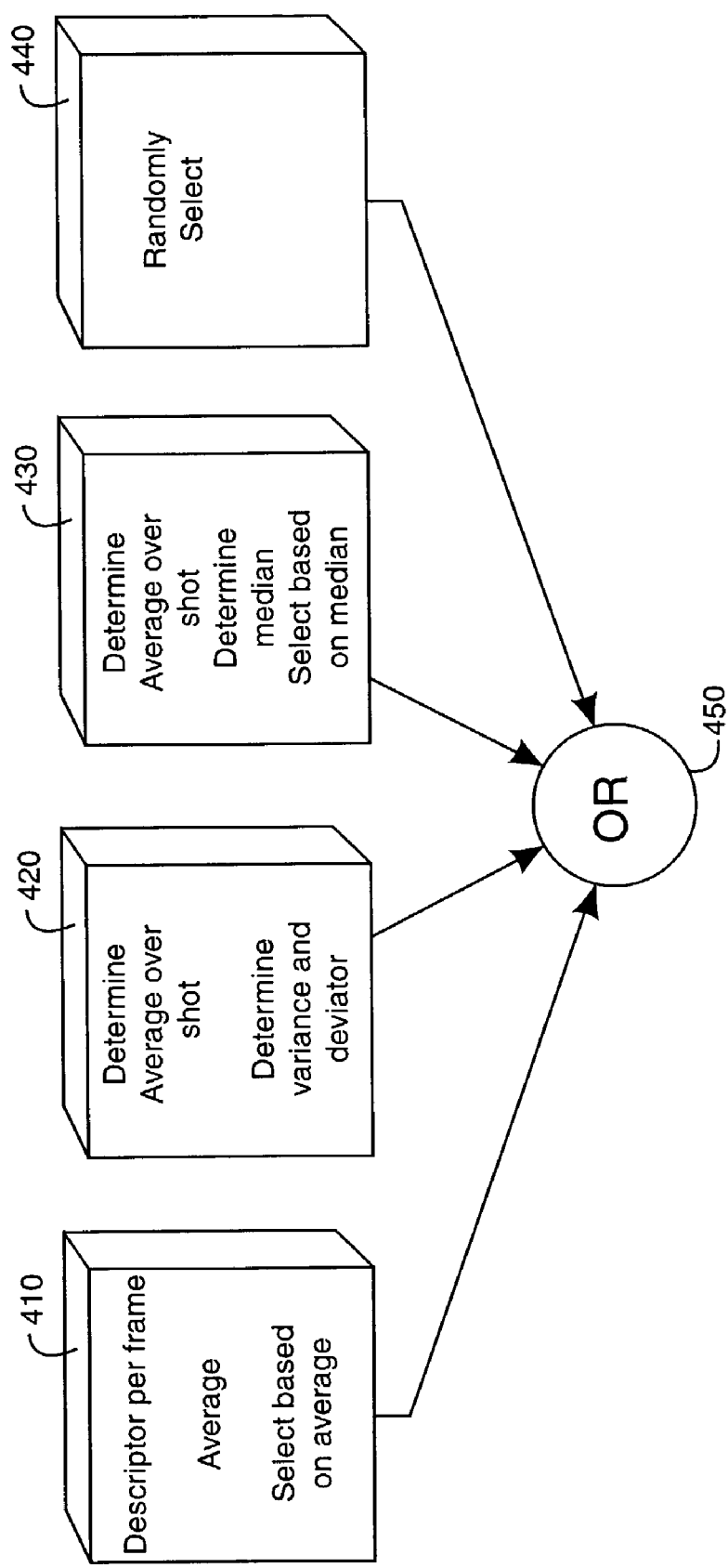
FIG. 4 is a flow diagram of steps that can be used to determine activity descriptors for a shot.

FIG. 4 shows a method 400 for determining the activity parameters for the shot 103 including a sequence of frames or object. We find the parameters for the shot using any one of the following method steps.

In step 410, we determine activity descriptors 100 for each P-frame/object in the shot as described above, and then we determine the average for each macro-block over the entire shot. We use the descriptor of the frame/object that is the closest to this average.

In step 420 we determine the average of all the parameters over the shot. The average is then used as the activity descriptor for the shot. In addition to the average of the shot parameters, we can also determine the variance (or standard deviation) of the average and deviation parameters, as well as of the other parameters. The deviation parameters provide confidence measures for the average based descriptor parameters described earlier. Thus we have four statistical parameters and three run-length features extracted using motion vector magnitudes, and four statistical parameters extracted using the direction of the motion vectors.

Step 430 determines the $C_{avg}$ for each P-frame/object in the shot. We determine the median of $C_{avg}$ over all the P-frames, and let the frame number of the median be n. Then, we use the descriptor of frame n as the shot descriptor.

Step 440 randomly selects a P-frame/object in the shot, and uses the randomly selected descriptor. We prefer to select 450 step 420.

Mode Decision Based on Quantized α-Histograms

In an alternative embodiment, we focus our attention on macro-blocks that have a motion vector of (0,0). In this section, we describe feature extraction from a compressed bitstream using the number of blocks that have the motion vector (0,0). We use a ratio α of macro-blocks with the motion vector (0,0) and the total number of macro-blocks as an indication of the intensity of the activity in the frame. We then use α to construct a Motion Quantized Histogram (MQH) by quantizing the values of α over the shot.

Generally, the motion quantized α-histogram is a histogram of quantized α-ratios in a given video unit. Each P-frame in the video unit has an associated α-ratio determined as described below. After the quantized α-ratios have been determined from each of the P-frames in a video unit, the motion quantized α-ratio histogram is determined.

Figure 5:
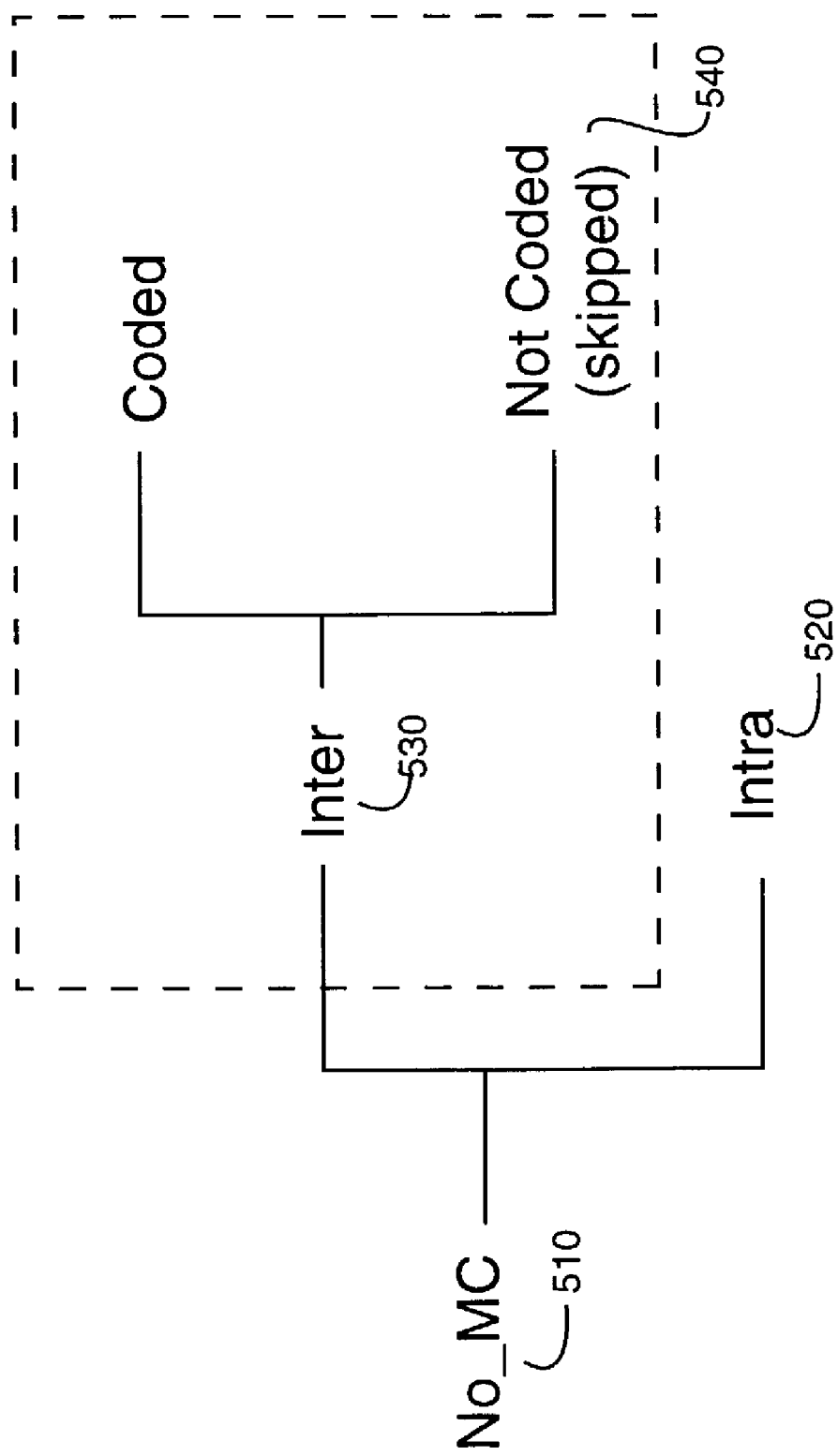
FIG. 5 is a block diagram of coding steps.

Our feature extraction method for computing the MQH is based on the following simple observation as shown in FIG. 5. The number of macro-blocks with motion vector (0,0), or no motion compensation inter-coded (No_MC$_{13}$ inter) blocks, indicates whether there is a significant motion-related change in the frame. For example, if most of the blocks are No_MC_inter blocks, then the motion-related changes in the frame are low and hence the activity is low.

In MPEG compressed video, the No_Motion_compensated, or No_MC macro blocks 510 indicate either a significant change due to entry or uncovering of new material. In this case, the blocks are intra-coded 520, or zero-motion, in which case they are inter-coded 530, or skipped 540. More specifically, the No_Motion_compensated_intercoded blocks signify changes occurring from one frame to the next. These blocks can be used to quantify the motion changes in the shot.

When a prediction macro-block cannot find a matched macro-block from its reference frame or frames, the intra coding strategy is used for its encoding. This case may occur in both P- and B-frames in an MPEG video. When a prediction macro-block matches the macro-block in its reference frame of the same position, inter No_MC is introduced for its encoding. Only P-frames of MPEG macro-block have inter No_MC macro-blocks. We can also divide inter No_MC into two categories, namely coded 535 and not coded (skipped) 540.

A video sequence usually has some temporal redundancy, so its P-frames can be used as representative samples of the video. Moreover, P-frames have a unique inter No_MC macro-block type that we use for feature description. This is one reason we prefer processing video P-frames.

From the definition of inter_No_MC, we can determine whether the content is substantially changing from frame to frame. Many macro-blocks can be matched by their reference frames, and thus, the inter No_MC macro-block numbers is usually high in a P-frame. For example, pauses of sports games often coincide with small object motion and a fixed camera in videos, so their corresponding inter No_MC macro-block numbers is also very high.

On the contrary, when the content changes rapidly, and thus, many macro-blocks cannot be matched by their reference frames, the inter No_MC marcro-block numbers is usually small in the P-frame. Here, we define the α-ratio of a P-frame as:

$$\alpha = \frac{\text{Number of inter No\_MC Macroblocks}}{\text{Total Number of Frame Macroblocks}}$$

This ratio is a good measure of scene change that conforms with human perception. The higher the ratio, the lower the scene change is. Because our objective is to find motion change levels, it is not necessary to use α-ratio directly for video motion description. So, we further quantize the ratio into several levels.

Here, we use a logarithmic compandor that has been widely applied to speech telephony for quantization, see Kim et al. in "Temporally Aggregated Motion Histogram Descriptor," ISO/IEC/SC29/WG11 MPEG99/P515, February 1999. Generally, a compandor is a device or a method that incorporates both a compressor and an expander, each of which may be used independently. With this method, we can keep quantization step higher for high ratio values.

Figure 6:
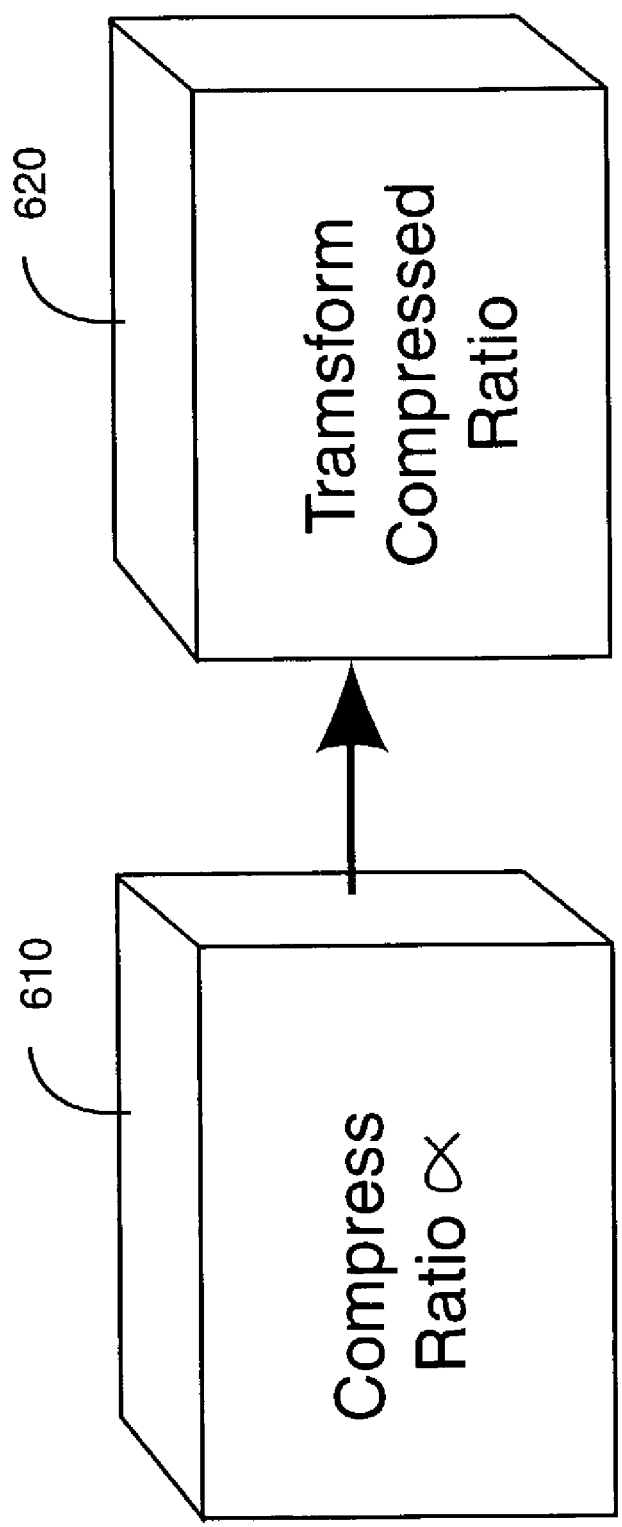
FIG. 6 is a flow diagram of a compandor process.

FIG. 6 shows a two step method used in our quantization. First in step 610, we compress the ratio using the $\mu$_law characteristic:

$$G_u(\alpha) = Q \frac{\log(1 + u\alpha/Q)}{\log(1 + \mu)}; \alpha \leq Q$$

where the parameter $\mu$ is set to 255 and Q is set to 1.

Second in step 620, we use a vector quantization method to transform $G_u(\alpha)$ into $N_l$ quantized change levels. A code book of $N_l$ entries is extracted from the $G_u(\alpha)$ data set first, then $G_u(\alpha)$ values are indexed using the code book. Preferably, we set $N_l=5$. We use the index of $G_u(\alpha)$ as the quantized level, therefore the change of a scene can be characterised by a level L=i, where i=1, 2, 3, 4, 5.

Figure 7A:
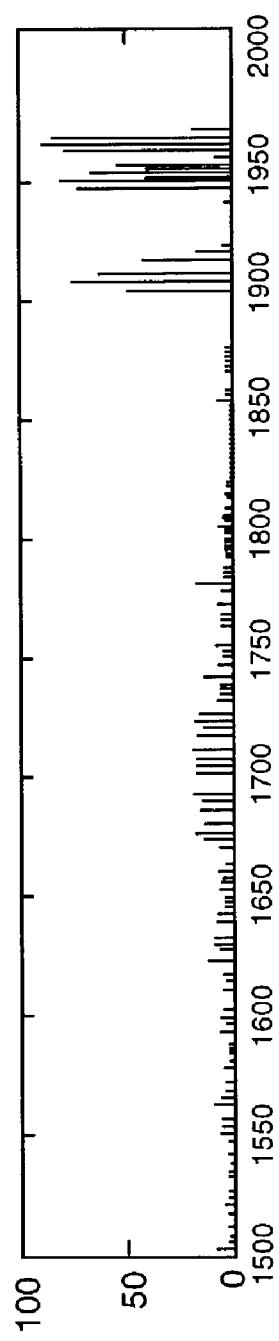
FIGS. 7a and 7b are graphs comparing raw and quantized ratios.
Figure 7B:
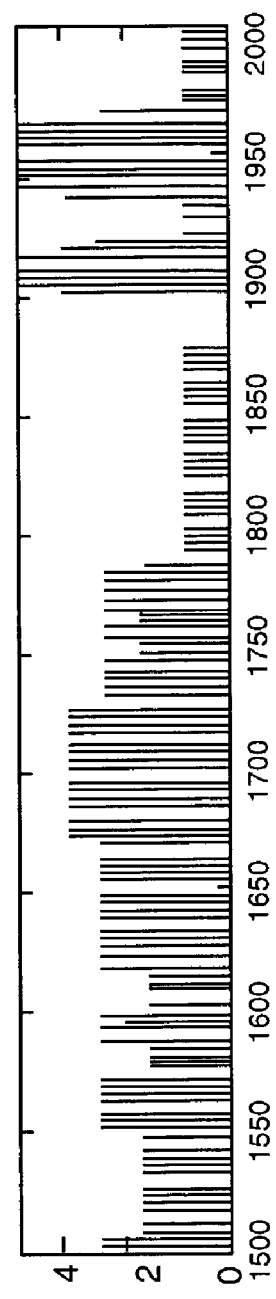

FIGS. 7a and 7b compare such quantization results on P-frames 1500 to 2000 of the MPEG-7 standard "soccer video" test data "V18." As stated above, we do not use the I- and B-frames. The original α-ratios scaled by 100 are shown in FIG. 7(a), and the quantized change levels are shown in FIG. 7(b). Within the time range, from frames 1880 to 1970, there is a pause in the game. During the pause, the scene change has a very low value and the P-frames within the pause have high quantized levels.

Activity Descriptor from Optical Flow

The parameters we have described so far make use of information that can directly be extracted from a compressed video. Compressed video typically makes use of block matching for its motion estimation, and thus the associated motion estimation is coarse in resolution. In this section, we describe activity parameters that make use of motion estimation with finer resolution, namely, optical flow. Note that optical flow based techniques are applicable to compressed video as well, either by incurring the extra computational cost of decompression prior to computation of optical flow, or by considering motion vectors to be a coarse representation of optical flow. Similarly the compressed domain techniques described earlier are applicable to uncompressed video as well at the additional cost of compression prior to feature extraction.

Here, we estimate activity level in a shot, and define a shot activity histogram and a shot activity level. A shot is defined as a sequence of frames/objects I(t), I(t+1), ... I(t+n-1).

Shots perceived as "high-action," e.g., high-speed car chase, fast moving dance, action sports, etc., typically have several objects with rapid and random movements. Shots perceived as "low-action," e.g., talking heads, stills, etc., have objects with small or no movements. To estimate activity level based on this observation, we determine whether objects in a frame and their motion.

Figure 8:
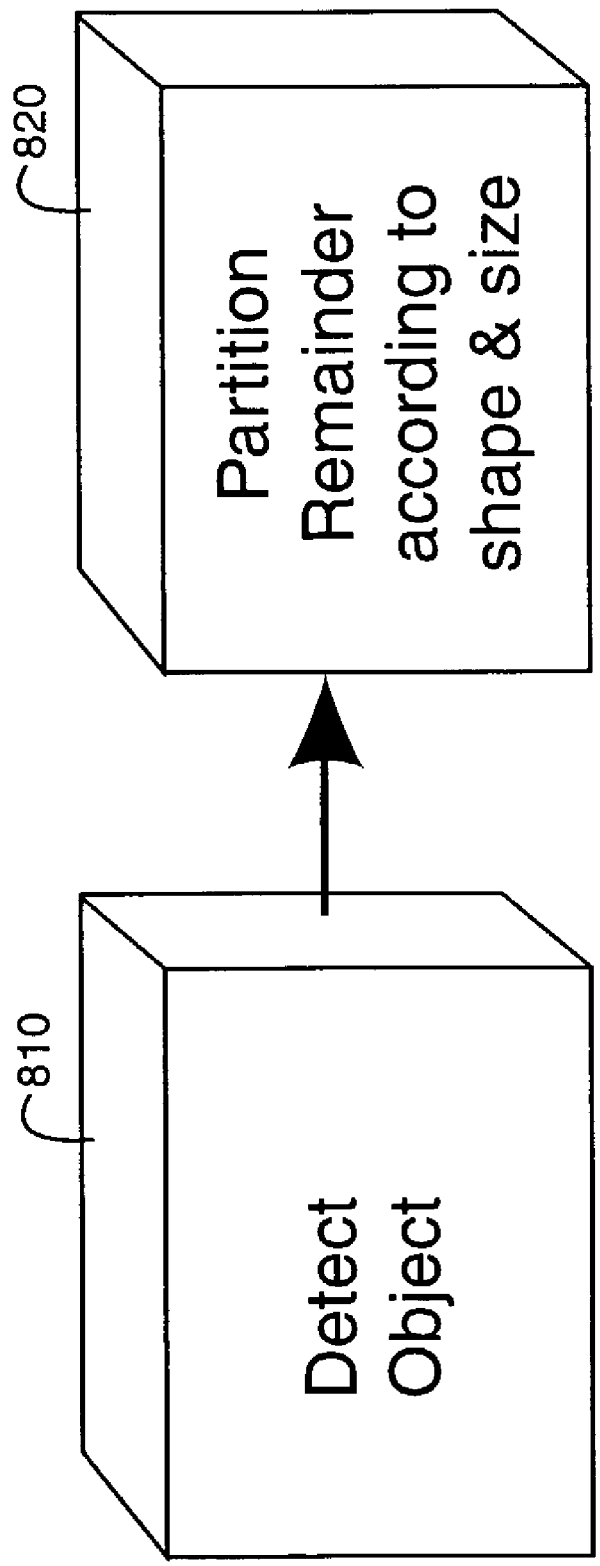
FIG. 8 is a flow diagram of a method for detecting objects in a video sequence.

FIG. 8 shows a two step method for approximating object regions in a frame. In step 810, we focus on colour intersection to detect known objects, using a technique described by Chang in "Compressed-domain techniques for image/video indexing and manipulation," IEEE International Conference on Image Processing, Volume-I, pp. 314–317, 1995. In step 820, we partition the remainder into regions of given shape and size. Object motion is estimated as the regions average optical flow.

Optical Flow Fields

Optical flow fields at a time t can be determined from the following optical flow constraint equations using a multi-point method with a 2×2 neighbourhood, see Nesi et al. in "A vision system for estimating people flow," Image Technology, pp. 179–201, 1996. The flow constraint can be described by:

$$\frac{\partial g(x, y, t)}{\partial t} + \frac{\partial g(x, y, t)}{\partial x} u + \frac{\partial g(x, y, t)}{\partial y} v = 0,$$

where g(x,y,t) is brightness at (x,y) in frame I(t) and u and v denotes the velocity components along x and y. Let u(t, i), v(t, i) denote the flow averaged over $i^{th}$ region R(t,i). Let u(t) and v(t) denote the flow averaged over the entire frame I(t). Then activity level A(t) is:

$$A(t) = \sum_{i=1}^{i=k} \sqrt{[u(t, i) - u(t)]^2 + [v(t, i) - v(t)]^2}$$

If three frames are used for optical flow estimation, then n-2 activity level values are obtained for a shot with n frames.

Shot Activity Histogram

Let A(t), A(t+1), ..., A(t+n-3) denote the n-2 activity level values obtained for a shot with n frames, as described above. We define a shot activity histogram as the normalized histogram of A(t) values of that shot. Let $A_{min}$ and $A_{max}$ denote the minimum and maximum values of A(t). Let H denote the shot activity histogram with b bins and H(i) denote the value at $i^{th}$ bin. Then H(i) is computed in two steps:

Step 1. H(i)=number of A(t) values between $$i \frac{(A_{max} - A_{min})}{b}$$

and $$(i+1) \frac{(A_{max} - A_{min})}{b}.$$

and
Step 2.

$$H(i) = \frac{H(i)}{\sum_{j=0}^{b-1} H(j)} \quad 0 \le i < b.$$

Note that such a temporal histogram could also be constructed using the quantized alpha described earlier.

Data Structures

As stated before, the activity descriptor according to the invention includes the following four attributes.

Intensity of Activity—A high value of intensity indicates high activity while a low value of intensity indicates low activity. For example, a still shot has a low intensity of activity while a "fast break" basketball shot has a high intensity of activity.

Direction of Activity—While a video shots may have several objects with differing activity, we can often identify a dominant direction. The Direction parameter expresses the dominant direction of the activity if any.

Spatial distribution of Activity—The spatial distribution of activity indicates whether the activity is spread across many regions or restricted to one large region. It is an indication of the number and size of "active" regions in a frame. For example, a talking head sequence would have one large active region, while an aerial shot of a busy street would have many small active regions.

Temporal Distribution of Activity—The temporal distribution of activity expresses the variation of activity over the duration of the video segment/shot. In other words, whether the activity is sustained throughout the duration of the sequence, or whether it is confined to a part of the duration.

The various parameters described above measure these attributes in different ways. For example, the optical flow based parameters express the intensity and temporal distribution of activity, while the run-length features express the spatial distribution of the activity. Here we provide a generic way to accommodate any of the parameters to express the overall activity of a video segment.

FIG. 9 shows a data structure 900 that can be used to store and communicate the activity descriptor according to the invention. Here, the intensity of motion forms the base layer, while other three fields contribute to the enhancement layer. All these fields may take any one of the following four structures.

The total_frames is the count of all frames between a start_frame and an end_frame. Even if some frame in not taken into account for the calculation of the activity descriptor, with respect to total_frames, all are taken into account.

Also, note that the segment details are captured under the assumption that the activity attributes determinations are based on the video portion of a bit-stream. If the activity is also calculated based on the audio portion, then the segment details are measured accordingly.

FIG. 10 shows a subdescriptor 1000. This structure will suit an implementation where there is only one final value as the activity descriptor. This could be an average over the values calculated for every frame or a selected frame. The parameter activity_power_sign denotes operation of multiplication or division of the activity_power over the activity_value.

FIG. 11 shows the details 1100 of a descriptor for the sign of the activity power parameter. This descriptor will suit an implementation where besides the average value, the percentage of occurrence of the values over n levels or m bins is given. Because we know that the percentage_value is in the range of zero to one, the flag to denote the multiplication or division operation, as in the case of sub_descriptor_1, is not required.

The data structure 1200 shown in FIG. 12 is intended to support an implementations that measure the deviation and average between a set of average calculated on a frame by frame basis.

The data structure 1300 of FIG. 13 accommodates some extra integer values besides the activity value. In this case, the parameter Nsr represents the short run length features of the motion vector rate matrix, and the parameters Nmr and Nlr denote the medium run-lengths and long run-length respectively.

The above four structures are just one specific implementation of how the activity descriptor according to our invention can be framed, keeping in mind the various implementation variants. It should be understood, that other implementation can accommodate any other extra details or some of the redundant fields could be removed where necessary.

For example, the avg_mot_complexity_value in sub_descriptor_4 and avg_alpha_value in sub_descriptor_2 can be removed, and the activity_value of sub_descriptor_1 can be used instead. This optimization is preferred only if the other fields tied with avg_mot_complexity_value and avg_alpha_value make sense with the combination of activity value. Also note that the segment details are captured under the assumption that the activity values are calculated based on the video portion, details will vary when the audio portion is used.

FIG. 14 shows a combined single data structure 1400 that can be used to store the activity descriptor 100 of FIG. 1.

Merged Activity Descriptor

A merged activity descriptor is a union of all the parameters we have described so far. However, a more efficient descriptor can be devised for specific higher level video processing applications that eliminate redundancy, or parameter that are not required for the application.

Intensity of Activity

This attribute can be expressed as a single integer lying in the range [0, n] where n is 128, 256, or some other power of two integer. The semantics express the intensity of activity.

Spatial Distribution of Activity

This attribute can be expressed as three integers and a floating point number to express the variance. The semantics expresses the size, number and location of the active regions.

Temporal Distribution of Activity

This attribute can be expressed as n integers, where n is 3, 4, 5 etc., as well as a floating point number to indicate the variance. The variance parameter functions as a confidence measure. However, accompanying every parameter with a confidence measure can be problematic for some applications. The semantics express the relative duration of different levels of activity in the sequence.

Direction of Activity

The direction of activity cannot always be determined since there might be several different objects moving in different directions. However, if there is in fact a dominant direction, then it is extremely useful to include. A dominant direction can be expressed as an angle between 0 and 360 degrees, and an associated confidence measure.

Combination of Attributes

As stated above, the measured attributes 111–114 are combined 110 into the activity descriptor 100. Possible combinations can be performed with an OR operation, an AND operation, a multi-dimensional representation, or a weighted sum, to name but a few combinatorial operators.

Searching and Matching with Activity Descriptors

After activity descriptors have been determined for video sequences the descriptors can be used in search and matching procedures of higher level video processing applications. Two possible search procedures are possible.

In a first procedure, a query shot is $S_a$ and a test shot is S. The "distance" $D(S,S_a)$ between S and $S_a$ is determined as follows:

$$W_{tot} = C_{avg}(S_a) + N_{sr}(S_a) + N_{mr}(S_a) + N_{lr}(S_a)$$

$$D(S, S_a) = \frac{W_{tot}}{C_{avg}(S_a)}|C_{avg}(S_a) - C_{avg}(S)| + \frac{W_{tot}}{N_{sr}(S_a)}|N_{sr}(S_a) - N_{sr}(S)| + \frac{W_{tot}}{N_{mr}(S_a)}|N_{mr}(S_a) - N_{mr}(S)| + \frac{2W_{tot}}{N_{lr}(S_a)}|N_{lr}(S_a) - N_{lr}(S)|$$

A second procedure uses a "cascaded" search. In this type of search we use one descriptor feature at a time, and successively refine the search with the other features. The cascaded procedure is slower but can give slightly higher accuracy.

Both of our search procedures represent attempts to normalise the individual features, while preserving simplicity of extraction and matching. While our search procedures give good results, other methods can also be used. For example, some of the limitations of simple minimum-Euclidean distance classifiers can be overcome by using a Mahalanobis metric. In particular, the Mahalanobis distance can solve problems caused by poorly scaled features since it automatically accounts for the scaling of the co-ordinate axes. It also corrects for correlation between the different features, and it can provide curved as well as linear decision boundaries.

Retrieval and Ranking

Retrieval can also be performed be using histogram similarity given a shot or shot activity histogram. The shot activity histogram will often be sparse resulting in large quantization errors. In order to reduce this effect, we use smoothed histograms. As nearby bins denote perceptually nearby activity levels, smoothing has no adverse effects. Let $\hat{H}_A$ and $\hat{H}_B$ denote the smoothed histograms. The similarity S(A,B) of shots A and B is evaluated as:

$$S(A, B) = \sum_{i=1}^{i=b-2} \min(\hat{H}_A(i), \hat{H}_B(i)).$$

For ranking shots based on its level of action, we define the shot activity level as the mean value of the shots activity levels.

Target Applications

The activity descriptor for video sequences according to our invention is useful in a number of applications.

Video Repurposing

While transmitting on narrow-band networks, it is useful to transmit more frames/visuals for segments with high activity, and less for other segments. A typical example is news video. Based on activities one can transmit fewer frames when nothing much is happening in the video and more frames when intense action occurs. Sports video is an example of such variation in activity over time.

Surveillance

In a crowd monitoring situation, high activity indicates a potential for trouble which needs to be investigated. This is extremely useful when the activity feature is extracted while capturing the data. A second example of surveillance is where one would like to search a security videos to see when and where a commotion originated. Similarly, the invention can be used to decide which of the security cameras should transmit video or which of the security monitors should be closely watched, the activity of the scene captured by that camera provides an important cue.

Fast Browsing

The activity measure enables grouping shots into clusters of the same range of activity, which allows users to search for a desired cluster quickly. Such clustering benefits by using the various attributes of the activity descriptor according to our invention. Consider the example of browsing a soccer match video. The interest is clearly in segments where goals are scored or where fast attacks and/or defense is conducted. These segments will have high activity and thus can be located easily, thus allowing the user, for example, to watch only the high action shots to look for goal scoring opportunities.

Video Abstracting

The clustering of shots provided by the activity measure enables creation of "abstracts." For example, the highlights of a soccer match can be confined to a set of shots taken from the set of segments with high activity.

Other Repurposing Tasks

Examples of such tasks are modulating audio based on video activity. For example, an specific audio event can be detected by locating the associated video event using its video activity measure. An explosion, for example, would lead to flying debris, which in turn would lead to a high value of the video activity measure.

Video Editing/Assemblage

The pace, or activity of video segments provide character to the video and such a feature is very useful in automated/intelligent editing and assemblage systems.

Content Based Retrieval/Filtering

The activity measure provides a simple and intuitive classification of content. Such classification enables a user to quickly locate the desired content by restricting the search to content with a similar level of activity. For instance, if the user searches for a soccer sequence in a large archive, then the user can quickly identify a much smaller set of candidate matches that all have high action. Such a reduction of the search space enables more detailed descriptors to further refine the search/filtering over a much smaller set and thus make optimal use of computational resources.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for describing activity in a compressed video sequence, comprising the steps of:
   measuring intensity attributes of the activity in the compressed video sequence;
   measuring direction attributes of the activity in the compressed video sequence;
   measuring spatial attributes of the activity in the compressed video sequence;
   measuring temporal attributes of the activity in the compressed video sequence; and
   combining the measured intensity, direction, spatial and temporal attributes of the activity in a digital descriptor of the activity of the compressed video sequence.

2. The method of claim 1 wherein the compressed video sequence includes video components.

3. The method of claim 1 wherein the compressed video sequence includes audio components.

4. The method of claim 1 wherein the compressed video sequence includes a plurality of frames.

5. The method of claim 1 wherein the compressed video sequence includes a plurality of video objects.

6. The method of claim 1 further comprising:
   measuring motion vectors representing the activity in the compressed video.

7. The method of claim 6 further comprising:
   measuring magnitudes of the motion vectors; and
   averaging the measured magnitudes.

8. The method of claim 6 wherein run-lengths of the motion vectors are measured.

9. The method of claim 8 wherein the run-lengths are classified as short, medium or long.

10. The method of claim 9 wherein the compressed video sequence includes a plurality of frames and run-lengths express the number, size, and shape of moving objects in the frames and distributions of the objects across the frames.

11. The method of claim 1 wherein the spatial attributes are expressed as an angle matrix.

12. The method of claim 1 wherein the compressed video sequence include a plurality of frames and each frame includes a plurality of macro-blocks, and further comprising the step of:
   averaging the measured attributes over the macro-blocks of the compressed video sequence.

13. The method of claim 1 wherein the compressed video sequence includes a plurality of frames and the attributes are measured for each frame, and further comprising the step of:
   randomly selecting one frame as representing the activity of the compressed video sequence.

14. The method of claim 9 wherein the compressed video sequence includes a plurality of frames, and each frame includes a plurality of macro-blocks, and further comprising the steps of:

counting the total number of macro blocks;

counting the number of macro-blocks having with a motion vector (0,0); and expressing the intensity attribute as a ratio of the two counts.

15. The method of claim 1 wherein the compressed video sequence is one of a plurality of compressed video sequences and each of the other of the plurality of compressed video sequences has a respective digital descriptor of the activity of the one compressed video sequence, and further comprising the step of:

matching the one compressed video sequence with another of the plurality of compressed video sequences based on the digital descriptors.

16. A method for describing an activity represented in a compressed video sequence, comprising:

deriving motion information of the activity representing the compressed video sequence;

determining an intensity attribute corresponding to an intensity level of the represented activity, a direction attribute corresponding to a direction of the represented activity, a spatial attribute corresponding to a spatial dimension of the represented activity, and a temporal attribute corresponding to a temporal dimension of the represented activity, based on the derived motion information; and describing the activity with a descriptor corresponding to the determined attributes.

17. A method according to claim 16, further comprising:

combining the intensity, the direction, the spatial and the temporal attributes to form the descriptor.

18. The method of claim 16, wherein the motion information is derived by extracting information from a motion vector included in the compressed video sequence.

19. The method of claim 18, wherein:

the extracted information includes one of a magnitude and an angle of the motion vector; and the motion vector represents one of a predictive frame and a predictive object included in the compressed video sequence.

20. The method of claim 19, wherein:

the compressed video sequence includes a plurality of macro-blocks of pixel data associated with the predictive frame or the predictive object included in the compressed video sequence;

each of the plurality of macro-blocks has an associated attribute; and at least one of the determined attributes includes the attribute associated with one of the plurality of macro-blocks which is closest to an average of the attributes associated with the plurality of macro-blocks.

21. The method of claim 19, wherein:

the compressed video sequence includes a plurality of macro-blocks of pixel data associated with the predictive frame or the predictive object included in the compressed video sequence; and the intensity attribute is determined by computing a ratio of the macro-blocks without a motion vector and the total number of macro-blocks associated with the predictive frame or the predictive object.

* * * * *